(12) United States Patent
Chern (10) Patent No.: US 11,428,871 B2
(45) Date of Patent: Aug. 30, 2022

(54) OPTICAL DEVICE FOR COUPLING LIGHT

(71) Applicant: Taiwan Semiconductor Manufacturing Company, Ltd., Hsinchu (TW)

(72) Inventor: Chan-Hong Chern, Palo Alto, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 80 days.

(21) Appl. No.: 17/035,588

(22) Filed: Sep. 28, 2020

(65) Prior Publication Data

US 2022/0099897 A1    Mar. 31, 2022

(51) Int. Cl.
 *G02B 6/34* (2006.01)
 *G02B 6/124* (2006.01)
 *G02B 6/12* (2006.01)

(52) U.S. Cl.
 CPC .............. *G02B 6/34* (2013.01); *G02B 6/124* (2013.01); *G02B 2006/12107* (2013.01)

(58) Field of Classification Search
 CPC . G02B 6/34; G02B 6/124; G02B 2006/12107
 See application file for complete search history.

(56) References Cited

U.S. PATENT DOCUMENTS

| 10,386,581 | B2 * | 8/2019 | Chen ...................... G02B 6/124 |
| 2004/0156589 | A1 * | 8/2004 | Gunn, III ........... G02B 6/12004 385/37 |
| 2014/0314374 | A1 * | 10/2014 | Fattal ..................... G02B 6/124 385/33 |
| 2016/0246009 | A1 * | 8/2016 | Jiang ..................... G02B 6/124 |

* cited by examiner

*Primary Examiner* — Ellen E Kim
(74) *Attorney, Agent, or Firm* — JCIPRNET (57) ABSTRACT

An optical device for coupling light propagating between a waveguide and an optical transmission component is provided. The optical device including a taper portion and a grating portion. The grating portion is connected to the taper portion. The grating portion includes grating patterns. Ends of the grating patterns are separated from an outer edge of the optical device by a distance.

20 Claims, 8 Drawing Sheets

OPTICAL DEVICE FOR COUPLING LIGHT

BACKGROUND

Light offers many advantages when used as a medium for propagating information, the foremost of which are increased speed and bandwidth. Light can be propagated through planar waveguide structures as well as optical fibers. Planar waveguide structures are advantageous because they can be compactly incorporated together in or on a planar platform, i.e. substrate, to form planar packages analogous to integrated circuits (ICs). These structures in general are referred to as integrated optics. Integrated optical "chips" comprise a substrate on which or in which various integrated optical components or devices are formed. Planar waveguides analogous to conductor traces in semiconductor electronic ICs that are mounted in or on the substrate are employed to guide light to various optical, electro-optical, and optoelectronic devices or components on the chip.

In many applications, it is desirable that the optical signal being transmitted through the planar waveguide structure be optically coupled into or out of the integrated optical chip. These signals may, for example, be coupled to an optical fiber that is oriented out of the plane, i.e., above or below, the planar waveguide structure via a grating coupler. Unfortunately, this process, as well as a reverse process in which optical gratings are used to redirect light from an on-chip light source to an optical fiber, may exhibit poor coupling efficiency. There exists a need to develop an apparatus of efficient optical coupling using optical gratings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1A:
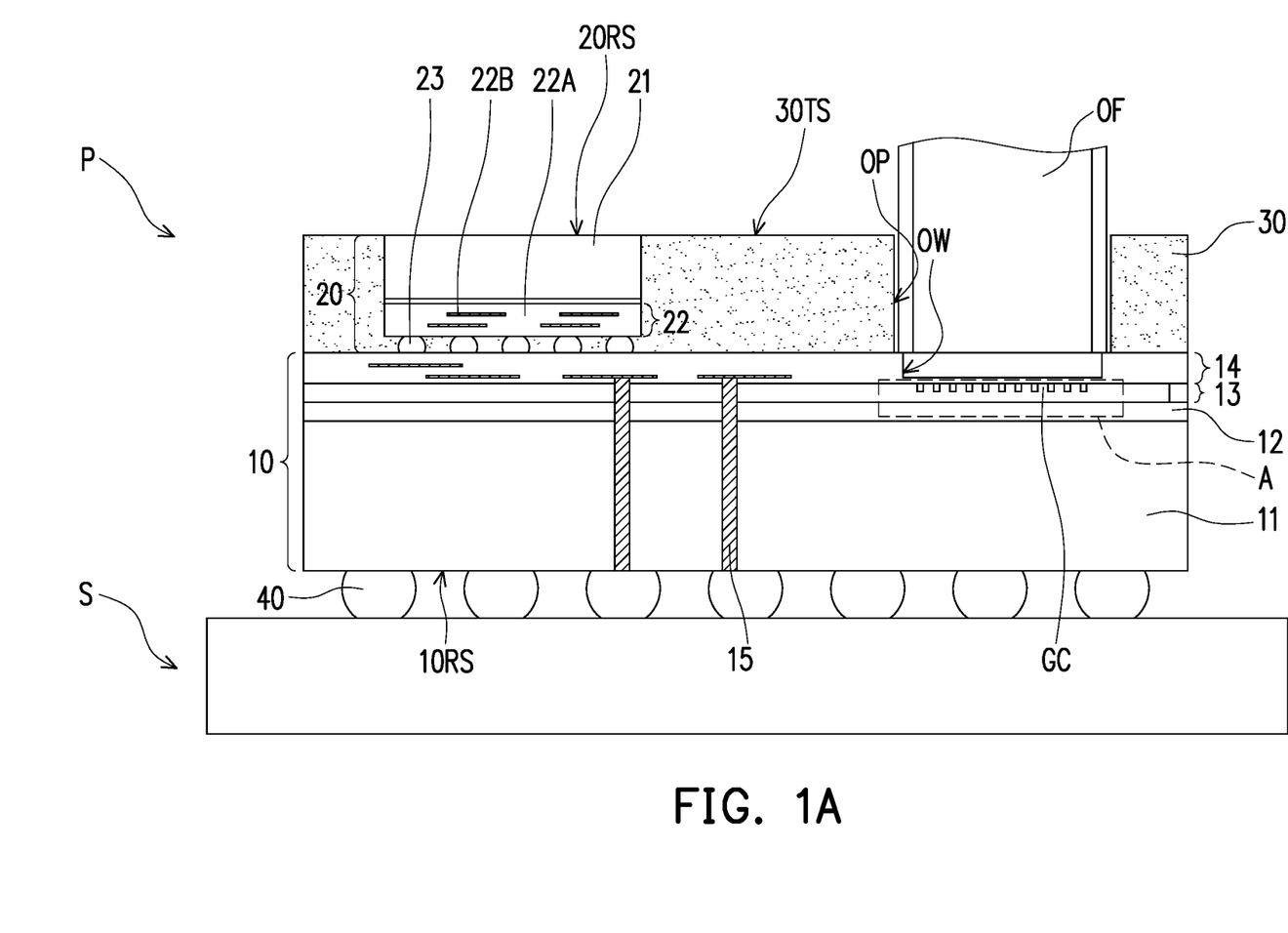
FIG. 1A is a cross-sectional view schematically illustrating a semiconductor device in accordance with some embodiments of the present disclosure.

FIG. 1A is cross-sectional views schematically illustrating a semiconductor device in accordance with some embodiments of the present disclosure. Referring to FIG. 1A, the package structure P includes a photoelectric integrated circuit die 10, an electric integrated circuit die 20, and an insulating encapsulant 30. The electric integrated circuit die 20 is over and electrically connected to the photoelectric integrated circuit die 10. The insulating encapsulant 30 laterally encapsulates the electric integrated circuit die 20.

In some embodiments, the package structure P is mounted on and electrically coupled to a substrate S. The substrate S may be or may include a package substrate, a printed circuit board (PCB), an interposer, and/or other circuit carrier that is capable of carrying integrated circuits.

The photoelectric integrated circuit die 10 may be or may include logic dies (e.g., central processing unit, microcontroller, etc.), system-on-chip (SoC) dies, or combinations thereof. In some embodiments, the photoelectric integrated circuit die 10 includes a semiconductor substrate 11, a dielectric layer 12 and a light-guiding material layer 13. The semiconductor substrate 11 may be or may include a bulk silicon substrate, a silicon germanium substrate, or a substrate formed of other semiconductor materials. The semiconductor substrate 11 may include other conductive layers or other semiconductor elements, such as transistors, diodes, resistors, capacitors or the like. In some embodiments, the dielectric layer 12 is formed over the semiconductor substrate 11, and a material of the dielectric layer 12 may include silicon oxide, silicon nitride, silicon oxynitride or other suitable dielectric materials. In some embodiments, the light-guiding material layer 13 is formed over the dielectric layer 12, and is configured for the transmission of optical signals.

In some embodiments, the light-guiding material layer 13 includes waveguides (not individually illustrated) and a grating coupler GC optically coupled to the waveguides. The grating coupler GC may serve as an optical input/output (I/O) device for the photoelectric integrated circuit die 10. The grating coupler GC may be configured to transmit optical signals between the light-guiding material layer 13 and an external optical element (such as an optical fiber OF). The materials of the waveguides and grating coupler GC of the light-guiding material layer 13 may be or may include silicon, or other suitable semiconductor materials.

The photoelectric integrated circuit die 10 may include various devices and circuits (not shown) that may be used for processing and transmitting optical signals and/or electrical signals. In some embodiments, the photoelectric integrated circuit die 10 further includes an interconnect structure 14 over the light-guiding material layer 13 and through semiconductor vias (TSVs) 15 electrically connected to the interconnect structure 14. In some embodiments, the interconnect structure 14 is electrically connected to the conductive layers or other semiconductor elements formed in the semiconductor substrate 11. The interconnect structure 14 formed on the semiconductor substrate 11 may include a dielectric layer and interconnect wirings embedded in the dielectric layer.

The electric integrated circuit die 20 may be or may include logic dies (e.g., central processing unit, microcontroller, etc.), memory dies (e.g., dynamic random access memory (DRAM) dies, static random access memory (SRAM) dies, etc.), power management dies (e.g., power management integrated circuit (PMIC) dies), radio frequency (RF) dies, micro-electro-mechanical-system (MEMS) dies, signal processing dies (e.g., digital signal processing (DSP) dies), front-end dies (e.g., analog front-end (AFE) dies), system-on-chip (SoC) dies, or combinations thereof. In some embodiments, the electric integrated circuit die 20 includes a semiconductor substrate 21 and an interconnect structure 22 over the semiconductor substrate 21. The semiconductor substrate 21 may be or may include bulk silicon substrate, a silicon germanium substrate, or a substrate formed of other semiconductor materials. The semiconductor substrate 21 may include other conductive layers or other semiconductor elements, such as transistors, diodes, resistors, capacitors or the like. In some embodiments, the interconnect structure 22 is electrically connected to the conductive layers or other semiconductor elements formed in the semiconductor substrate 21. The interconnect structure 22 formed on the semiconductor substrate 21 may include a dielectric layer 22A and interconnect wirings 22B embedded in the dielectric layer 22A.

In some embodiments, the electric integrated circuit die 20 is mounted onto and electrically connected to the photoelectric integrated circuit die 10 through a plurality of electrical terminals 23. The electrical terminals 23 may be or may include micro bumps, ball grid array (BGA) connectors, solder balls, metal pillars, controlled collapse chip connection (C4) bumps, electroless nickel-electroless palladium-immersion gold (ENEPIG) formed bumps, or the like. Other possible forms and shapes of the electrical terminals 23 may be utilized according to design requirements.

In the embodiment shown in FIG. 1A, the insulating encapsulant 30 is disposed over the photoelectric integrated circuit die 10 to encapsulate the electric integrated circuit die 20. The insulating encapsulant 30 may laterally encapsulate the electric integrated circuit die 20 and a rear surface 2ORS of the electric integrated circuit die 20 may be revealed from and substantially leveled with a top surface 30TS of the insulating encapsulant 30. In some embodiments, the insulating encapsulant 30 includes a base material and filler particles distributed in the base material. In some embodiments, the material of the base material includes epoxy resins, phenolic resins or silicon-containing resins, or the like, and the material of the filler particles includes silica, alumina, zinc oxide, titanium dioxide, or the like. However, in some alternative embodiments, the insulating encapsulant 30 is formed by a deposition process, and the insulating encapsulant 30 includes silicon oxide, silicon nitride, silicon oxynitride or other suitable dielectric materials.

Referring to FIG. 1A, the interconnect structure 14 in the photoelectric integrated circuit die 10 may allow optical transmission between the photoelectric integrated circuit die 10 and an external element (e.g., an optical fiber OF). The interconnect structure 14 may be provided with an optical window OW directly over the grating coupler GC to facilitate optical transmission. As shown in FIG. 1, the insulating encapsulant 30 has an opening OP on top of the optical window OW of the photoelectric integrated circuit die 10.

In some embodiments, an optical fiber OF is optically coupled to the photoelectric integrated circuit die 10. The optical fiber OF may be optical coupled to the grating coupler GC of the photoelectric integrated circuit die 10. It is appreciated that the configuration of the optical fiber OF shown in FIG. 1A is schematic, and in some embodiments, a coupling element (not shown) may be used to secure the optical fiber OF, and the coupling element and the optical fiber OF may be attached to the photoelectric integrated circuit die 10 or an intermediary waveguide element (not shown) through adhesive films, such as optical clear adhesive or other suitable optical glue/grease.

The package structure P may further include a plurality of electrical terminals 40 may be disposed over the rear surface 10RS of photoelectric integrated circuit die 10 to be electrically connected to the TSVs 15 of the photoelectric integrated circuit die 10. The electrical terminals 40 may be or may include micro bumps, ball grid array (BGA) connectors, solder balls, metal pillars, controlled collapse chip connection (C4) bumps, electroless nickel-electroless palladium-immersion gold (ENEPIG) formed bumps, or the like. Other possible forms and shapes of the electrical terminals 40 may be utilized according to design requirements. In some alternative embodiments, the electrical terminals 40 may be electrically connected to the TSVs 15 of the photoelectric integrated circuit die 10 through a redistribution circuit layer (not shown) between the photoelectric integrated circuit die 10 and the electrical terminals 40. The redistribution circuit layer (not shown) may include a plurality of dielectric layers and a plurality of redistribution layers stacked alternately.

The semiconductor device shown in FIG. 1A is an exemplary semiconductor device in accordance with some embodiments of the present disclosure, semiconductor devices with other suitable arrangements and with photoelectric integrated circuit dies of other suitable configurations are within the contemplated scope of the disclosure.

Figure 1B:
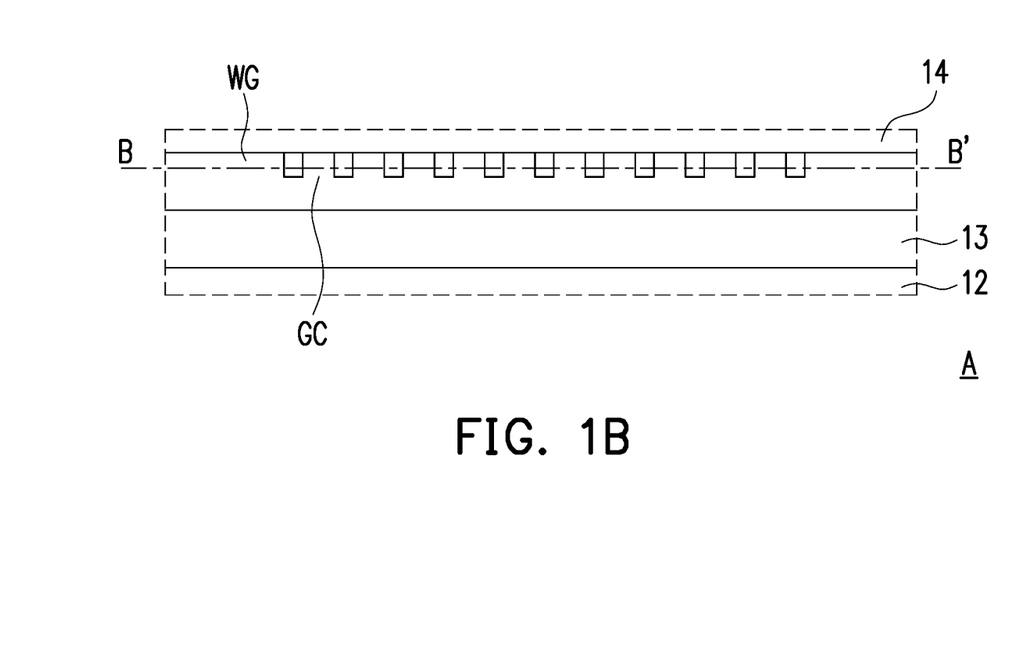
FIG. 1B is an enlarged view of a portion of the semiconductor device in FIG. 1A.
Figure 2:
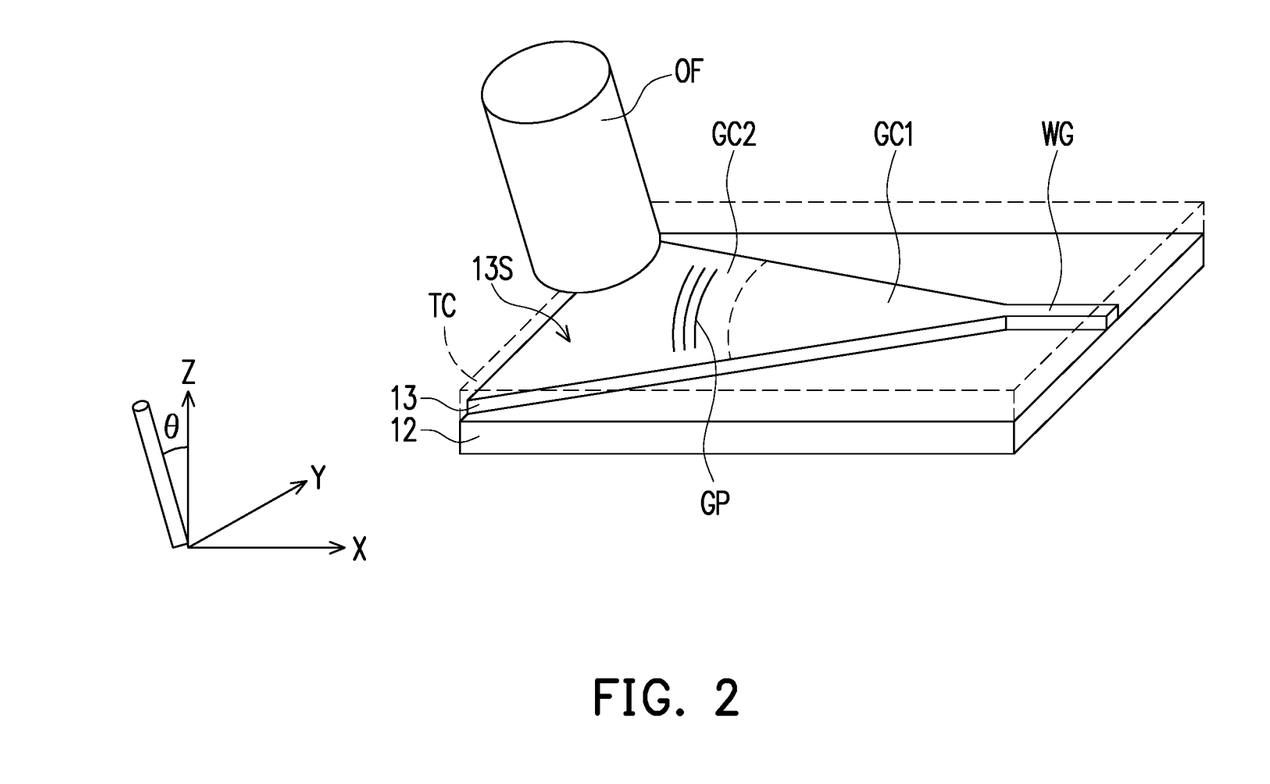
FIG. 2 is a perspective view schematically illustrating a semiconductor structure in accordance with some embodiments of the present disclosure.

FIG. 1B is an enlarged view of a portion of the photoelectric integrated circuit die 10 of the package structure P marked by the dashed box A in FIG. 1A. FIG. 2 illustrates a perspective view of a semiconductor structure similar to the semiconductor structure shown in FIG. 1B in another perspective of view. Referring to FIG. 2, the light-guiding material layer 13 is disposed atop the dielectric layer 12. The light-guiding material layer 13 includes a waveguide WG and a grating coupler GC. In some embodiments, the light-guiding material layer 13 has an upper surface 13S facing the optical fiber OF. The light-guiding material layer 13 may be made of material having high refractive indexes for desired wavelength. For example, the light-guiding material layer 13 may be or may include silicon such that the light-guiding material layer 13 may have high refractive indexes for infrared light (e.g., light having a wavelength larger than about 700 nm). The dielectric layer 12 may function as a bottom cladding layer for the light-guiding material layer 13. As described previously with respect to FIG. 1A, a material of the dielectric layer 12 may include silicon oxide, silicon nitride, silicon oxynitride or other suitable dielectric materials. In some embodiments, the dielectric layer 12 is a buried oxide layer sandwiched between a semiconductor substrate (e.g., semiconductor substrate 11 shown in FIG. 1A) and the light-guiding material layer 13, and the dielectric layer 12 and the light-guiding material layer 13 may be made from a silicon on insulator (SOI) wafer. Other suitable materials are within the contemplated scope of the disclosure.

In some embodiments, the waveguide WG and the grating coupler GC are further covered with a top cladding layer TC. In some embodiments, the top cladding layer TC includes silicon oxide. In some embodiments, the top cladding layer TC can include other types of dielectric materials according to different applications, including polycrystalline silicon and silicon nitride. The top cladding layer TC is presented in a see-through manner in FIG. 2, such that the waveguide WG and the grating coupler GC can be shown.

The waveguide WG may be silicon waveguide of sub-micron dimension. For example, the waveguide WG may be silicon waveguide having a height of about 200 nm to 350 nm and a width of about 370 nm to 470 nm.

The semiconductor structure shown in FIG. 2 is for receiving light from or outputting light to an optical fiber OF. As illustrated in FIG. 2, the grating coupler GC includes a first portion GC1 and a second portion GC2. The first portion GC1 is optically coupled to the waveguide WG. The second portion GC2 is optically coupled to the first portion GC1, and the second portion GC2 is optically coupled to the optical fiber OF. The first portion GC1 may be a taper portion. The width of the first portion GC may increase as away from the waveguide WG. The second portion GC2 may be a grating portion. The second portion GC2 may include grating patterns GP. In some embodiments, a light from the waveguide WG may be directed to the optical fiber OF through the grating coupler GC, and a light from the optical fiber OF may be directed to the waveguide WG through the grating coupler GC. As shown in FIG. 2, in the embodiment which the grating coupler GC is arranged substantially on a plane parallel to the xy-plane, and the optical fiber OF may be arranged at an angle θ, e.g., about 5° to 15°, or about 8° to 10°, relative to the z-direction.

Despite showing a single waveguide WG and a single grating coupler GC in FIG. 1A and FIG. 2, more than one waveguides and grating couplers may be included in a package structure, e.g., package structure P shown in FIG. 1A, the numbers of the waveguide and the grating coupler are not limited by the disclosure. The waveguide WG may further be optically coupled to one or more additional photonic integrated circuits components (not shown). The one or more photonic integrated circuits components can include, for example, one or more of a second grating coupler, a photodetector, a modulator, a polarizer, a beam splitter, a coupler, a reflector, an optical amplifier, a filter, an interferometer, etc. The one or more photonic integrated circuits components can include active components, passive components or a combination of active and passive components.

Figure 3:
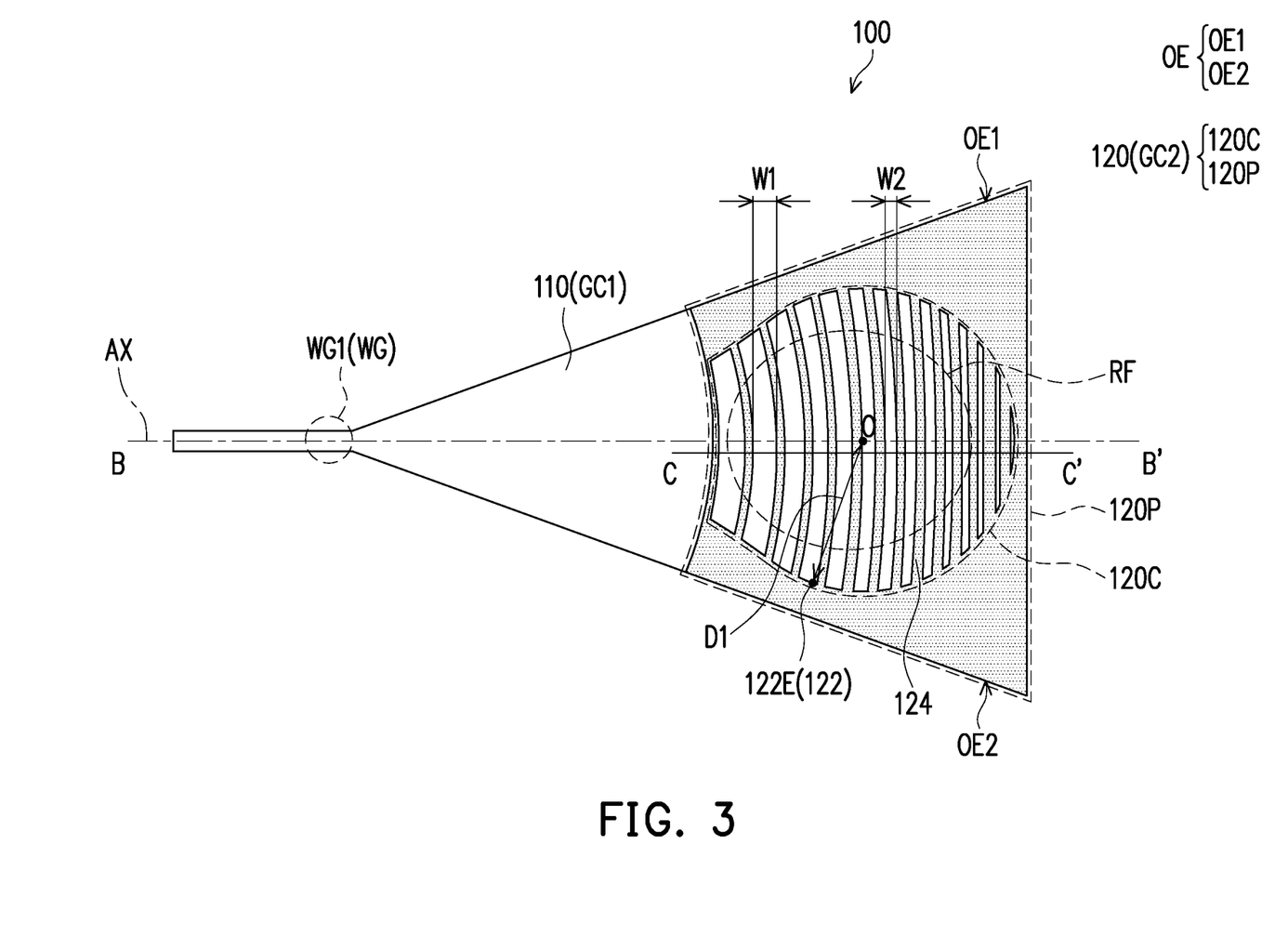
FIG. 3 is a schematic view of a semiconductor structure in accordance with some embodiments of the present disclosure.

FIG. 3 is a schematic view of a semiconductor structure in accordance with some embodiments of the present disclosure. FIG. 3 illustrates a cross-section view of the semiconductor structure similar to that of semiconductor structure of FIG. 1B along a cross-sectional line B-B'.

Referring to FIG. 3, the semiconductor structure includes a taper portion 110, a grating portion 120, and a waveguide WG, and the grating coupler 100 includes a taper portion 110 and a grating portion 120. The taper portion 110 may be similar to the first portion GC1 in FIG. 2. The grating portion 120 may be similar to the second portion GC2 in FIG. 2. The grating coupler 100 may be for coupling light propagating between a waveguide WG and an optical transmission component, e.g., an optical fiber similar to the optical fiber OF in FIG. 1A. In some embodiments, the grating portion 120 is connected to the taper portion 110. In some embodiments, the taper portion 110 is extended from a first end WG1 of the waveguide WG, and the taper portion 110 is disposed between the waveguide WG and the grating portion 120.

The grating portion 120 may include grating patterns 122. In some embodiments, ends 122E of the grating patterns 122 are separated from an outer edge OE of the grating coupler 100 by a distance. The outer edge OE may have two lateral sides OE1 and OE2 located on both sides of a central axis AX of the grating coupler 100 respectively. As shown in FIG. 3, the grating patterns 122 do not extend to the lateral sides OE1 and OE2, such that the light transmitted from or to the grating portion 120 may be more focused and loss of light may be reduced. For example, the light emitted from the grating portion 120 may be more focused in that the distribution of intensity of the light with respect to an axial radius may be more focused. As a result, the grating coupler 100 may provide higher coupling efficiency with respect to all frequencies, and thus the grating coupler 100 may have broader bandwidth.

Referring to FIG. 3, in some embodiments, the grating portion 120 have a coupling region 120C and a periphery region 120P. The grating patterns 122 may be confined within the coupling region 120C. The taper portion 110 and the periphery region 120P surround the coupling region 120C. In other words, the grating patterns 122 do not extend beyond the coupling region 120C, and an interval may exist between the coupling region 120C and the outer edge OE of the grating coupler 100. As such, the light transmitted from or to the grating portion 120 may be more focused and loss of light may be reduced. As shown in FIG. 3, the periphery region 120P includes no grating pattern, such that no coupling effect occurs in this area. However, in some instances, other types of patterns may be disposed in the periphery region 120P. The disclosure is not limited thereto.

In some embodiments, a region RF of the grating portion 120 (or the second portion GC2) is covered by a core of the optical fiber when the grating coupler 100 is optically coupled to the optical fiber. As shown in FIG. 3, the ends 122E of the grating patterns 122 may be located between an edge of the region RF covered by the core of the optical fiber and an outer edge OE of the grating coupler 100. The region RF covered by a core of the optical fiber may be the projection region of the light input/output surface at the end of the optical fiber on the grating coupler 100. As such, the grating patterns 122 is disposed corresponding to the core of the optical fiber, and the grating patterns 122 extend to cover a region corresponding to the core of the optical fiber to achieve higher coupling efficiency.

In some embodiments, the coupling region 120C may further include gaps 124 between the grating patterns 122, and the gaps 124 and the grating patterns 122 are located within the coupling region 120C. In some instances, the coupling region 120C may be the region occupied by the grating patterns 122 and the gaps 124 therebetween.

As shown in FIG. 3, in the embodiment, each of the grating patterns 122 may have a constant width. The width of the grating patterns 122 may be in a range from 50 nm to 650 nm. The grating patterns 122 may be arranged along at intervals from about 500 nm to about 700 nm, wherein the intervals are determined by the distance between the center of two adjacent grating patterns along the central axis AX. The intervals of the grating patterns 122 may be fixed, or in some embodiments, the intervals farther away from the waveguide WG may be narrower or wider.

In FIG. 3, the grating patterns 122 includes apodized grating patterns, wherein a grating pattern among the grating patterns 122 may have a width different from that of an adjacent grating pattern. But in some other embodiments, the grating patterns may include uniform grating patterns. In some embodiment, the grating patterns 122 may be arranged such that a first width W1 of a first grating pattern among the grating patterns 122 may be larger than a second width W2 of a second grating pattern among the grating patterns 122, wherein a first distance between the first grating pattern and the waveguide WG is less than a second distance between the second grating pattern and the waveguide WG. In other words, in the embodiment, the grating patterns 122 farther away from the waveguide WG may have a smaller width, such that the density of the grating patterns 122 decrease along a direction away from the taper portion 110. As such, the variation of the widths may further enhance the mode field matching between the grating region and the optical fiber. In some embodiments, the gaps 124 farther away from the waveguide WG may have a larger width.

In some embodiments, the grating patterns 122 may include arc-shaped grating patterns. As shown in FIG. 3, the cross-section of the grating patterns 122 may extend along an arc, e.g., a portion of a circle of an ellipse. The arc-shaped grating patterns may reinforce the focusing of the light to the center of the grating region and enhance the mode field matching between the waveguide and the optical fiber.

In some embodiments, the region RF covered by the core of the optical fiber may be substantially in a shape of circle or ellipse. Specifically, the shape of the light input/output surface at the end of an optical fiber (e.g., the optical fiber OF in FIG. 1A) may be substantially in a shape of circle or ellipse, such that the region RF covered by a core of the optical fiber may be substantially in a shape of circle or ellipse. In some instances, the diameter of an optical fiber core may be in a range of 8 μm to 10 μm, and thus the region RF covered by a core of the optical fiber may be substantially in a shape of circle or ellipse with a diameter in a range of 8 μm to 10 μm. In an example, a main portion of the periphery of the coupling region 120C may be substantially arc-shaped to be conformed to the shape of the region RF covered by a core of the optical fiber. The size of the optical fiber and the region covered by a core of the optical fiber is not limited in this disclosure.

As shown in FIG. 3, in the embodiment, a distance D1 from a center of the region RF covered by the core of the optical fiber to an end 122E of a grating pattern 122 of the grating portion 120 may be substantially 1.5 to 2 times of a radius of the region RF covered by the core of the optical fiber. As such, the grating patterns 122 are disposed according to the region RF covered by the core of the optical fiber to enhance the focusing of the light. Meanwhile, by disposing grating patterns 122 such that the distance from a center O of the region RF covered by the core of the optical fiber to an end 122E of a grating pattern 122 substantially ranges from 1.5 to 2 times of that of the region RF covered by the core of the optical fiber, the device provides positioning error tolerance of the optical fiber.

Please refer to FIGS. 4A to 4D. FIGS. 4A to 4D are cross-sectional views of the semiconductor structures similar to that of semiconductor structure illustrated in FIG. 3 along a cross-sectional line C-C'.

Figure 4A:
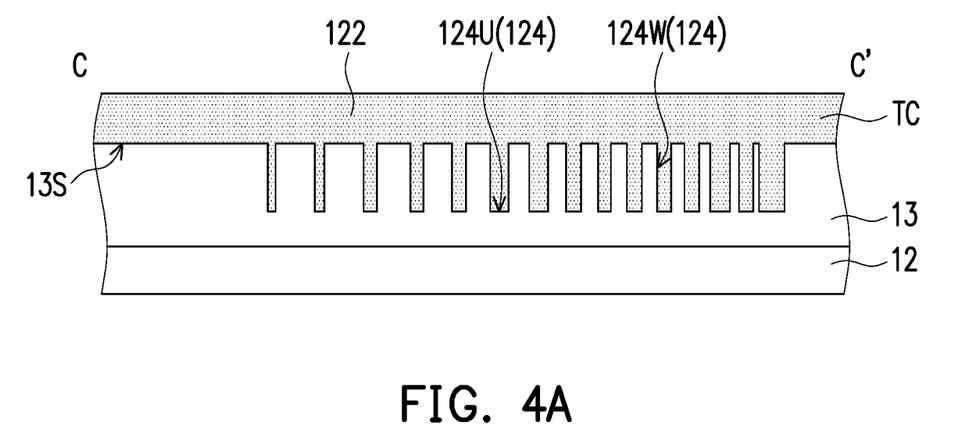
FIGS. 4A to 4D are cross-sectional views schematically illustrating a portion of semiconductor structures in accordance with some embodiments of the present disclosure.
Figure 4B:
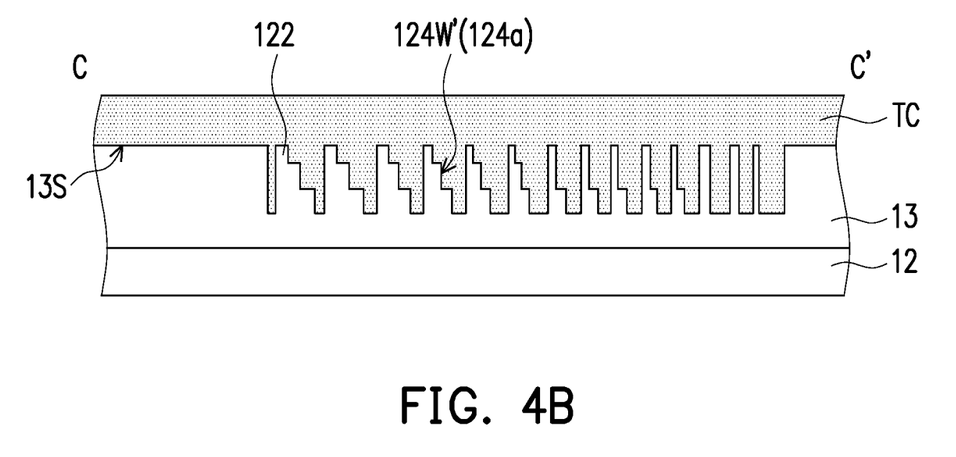
Figure 4C:
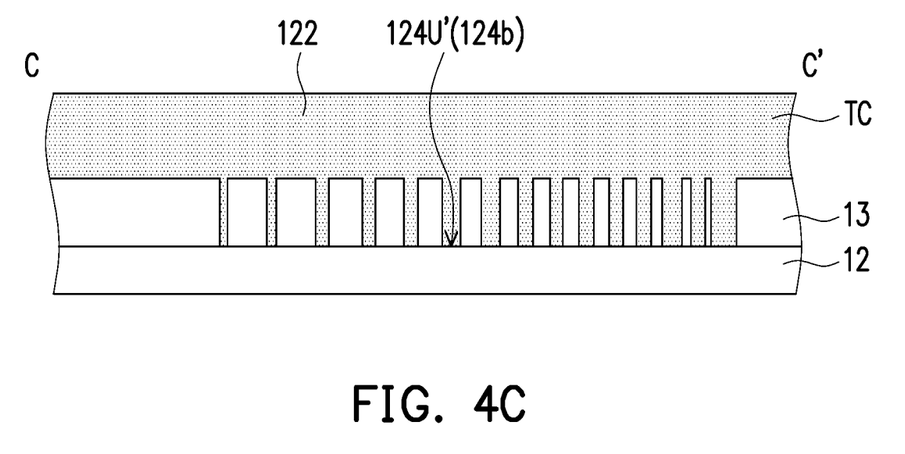
Figure 4D:
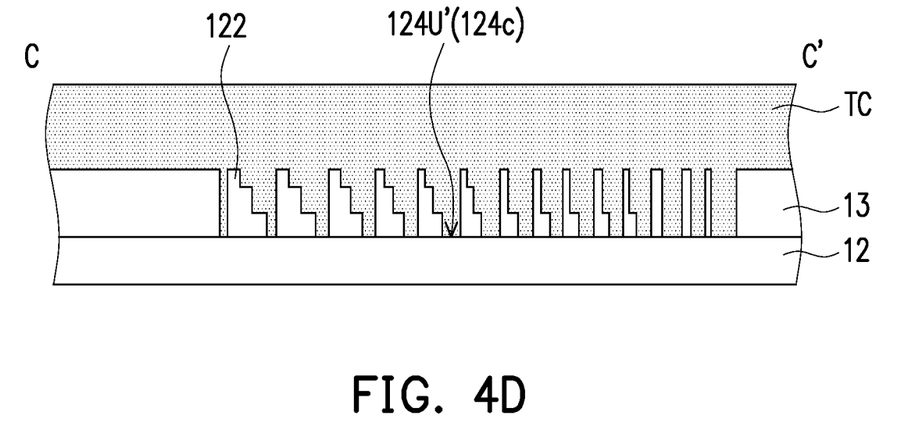

Referring to FIG. 4A, the grating patterns 122 are separated by the gaps 124 therebetween. The gaps 124 may be strip-shaped recesses on the upper surface 13S of the light-guiding material layer 13, and a top cladding layer TC atop the light-guiding material layer 13 may extend into the gaps 124 such that the gaps 124 are filled with cladding material having a refractive index smaller than that of the light-guiding material layer 13.

In the embodiment shown in FIG. 4A, the sidewalls 124W of the gaps 124 are substantially vertical. In another embodiment shown in FIG. 4B, the sidewalls 124W' of the gaps 124a may be step-shaped. The mode field matching between the waveguide and the optical fiber may be additionally enhanced by the step-shaped sidewalls 124W'and the amount of diffracted light directed to the optical fiber may be further increased. In some embodiments, more steps may be disposed on a sidewall of a gap having adjacent grating pattern of lager width.

In the embodiment shown in FIG. 4A, the bottoms 124U of the gaps 124 may be within the light-guiding material layer 13. However, in other embodiments, for example, the embodiments shown in FIGS. 4C and 4D, the bottoms 124U' of the gaps 124b and 124c may be an upper surface of the dielectric layer 12.

The manufacturing of the semiconductor structure may include etching the light-guiding material layer 13, e.g., etching the silicon layer on the SOI wafer. Multiple etching processes may be performed in order to obtain step-shaped sidewalls, e.g., the sidewalls 124W' shown in FIG. 4B. In some embodiments, the etching process may expose the upper surface of the dielectric layer 12 such that the bottoms 124U' shown in FIGS. 4C and 4D may be formed.

Figure 5:
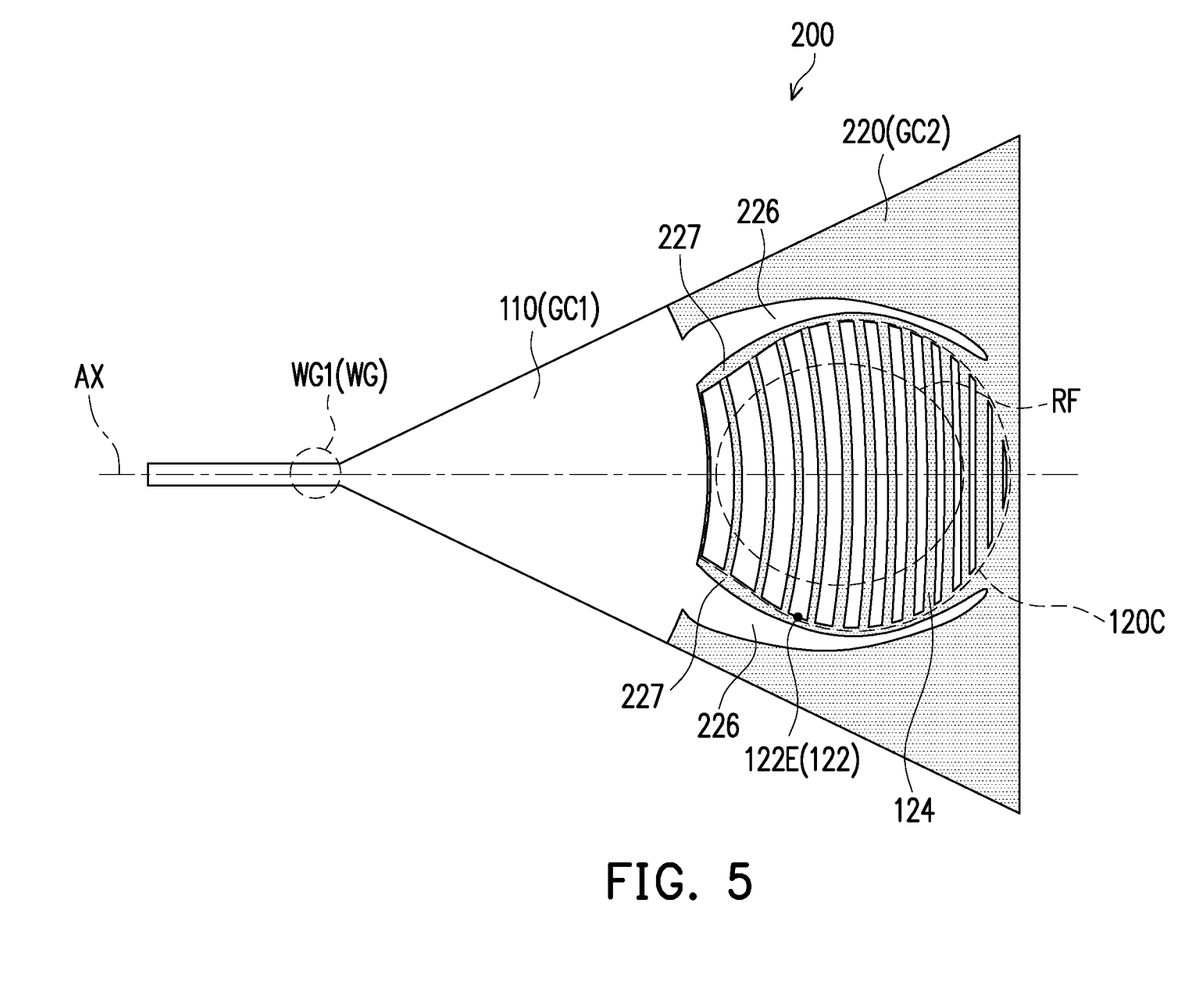
FIG. 5 is a schematic view of a semiconductor structure in accordance with some embodiments of the present disclosure.

FIG. 5 is a schematic view a semiconductor structure in accordance with some embodiments of the present disclosure. The semiconductor structure and the grating coupler 200 illustrated in FIG. 5 is similar to the semiconductor structure and the grating coupler 100 illustrated in FIG. 3 except that in the embodiment, the grating portion 220 (or, the second portion GC2) may further include a pair of light-confinement patterns 226 extending from the taper portion 110 (or, the first portion GC1). The pair of light-confinement patterns 226 may be disposed at opposite sides of the grating patterns 122, and the pair of light-confinement patterns 226 may be separated from the ends 122E of the grating patterns 122. In some embodiments, the pair of light-confinement patterns 226 surrounds and distances from the coupling region 120C. The light-confinement patterns 226 may be separated from the grating patterns 122 by a distance of about 0.1 μm to about 1 μm. The light-confinement patterns 226 may improve light confinement in the light-guiding material layer in the situation, for example, before light being coupled to optical fiber, and the evanescent light may be reduced. In an example, the light-confinement patterns 226 may extend to surround more than 80% of the perimeter of the coupling region 120C, or the light-confinement patterns 226 may extend to substantially cover the lateral sides of the region RF covered by a core of the optical fiber.

The light-confinement patterns 226 may be of a width from 1 μm to 3 μm. As shown in FIG. 5, in the embodiment, widths of the light-confinement patterns 226 may decrease as farther away from the waveguide WG or the taper portion 110. The variation of the widths may reduce the effective refractive index such that the evanescent light may be further decreased. In some embodiments, the light-confinement patterns 226 may present in a horn-shaped. In the embodiment, an end portion (or a first end) WG1 of the waveguide WG may be arranged along an axis AX, and the light-confinement patterns 226 are substantially symmetric with respect to the axis.

Referring to FIG. 2 and FIG. 5, in some embodiments, the pair of light-confinement patterns 226 are separated from the ends 122E of the grating patterns 122 by grooves 227 on the upper surface 13S of the light-guiding material layer 13. The grooves 227 may be formed by etching the light-guiding material layer 13 by a same or separate etching processes as the gaps 124, and after the etching processes, the grooves 227 may be filled with cladding material having a refractive index smaller than that of the light-guiding material layer.

Figure 6:
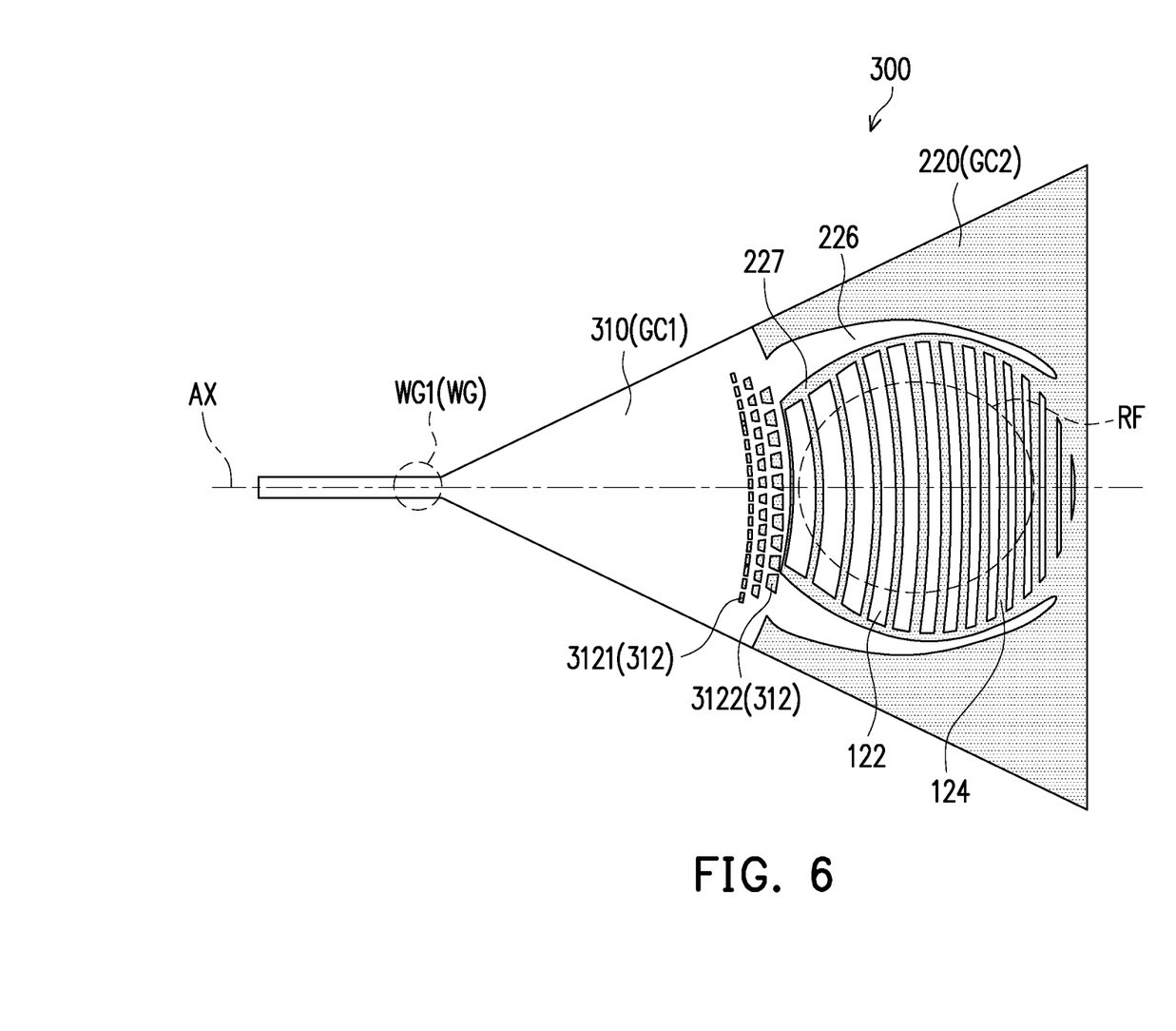
FIG. 6 is a schematic view of a semiconductor structure in accordance with some embodiments of the present disclosure.

FIG. 6 is a schematic view a semiconductor structure in accordance with some embodiments of the present disclosure. The semiconductor structure and the grating coupler 300 illustrated in FIG. 6 is similar to the semiconductor structure and the grating coupler 200 illustrated in FIG. 5 except that in the embodiment, the taper portion 110 (or, the first portion GC1) may further include modulating patterns 312 disposed in proximity to the grating portion 120 (or, the second portion GC2), and the modulating patterns 312 are separated from each other. The modulating patterns 312 may further improve mode field size matching between the grating patterns and the optical fiber. In the embodiment, the modulating patterns 312 are patterns of small sizes, for example, in a range from 60 nm to 300 nm, or from 60 nm to 200 nm or 250 nm. FIG. 6 shows modulating patterns 312 as trapezoid-shape patterns. However, the modulating patterns 312 can be rectangular-shape, circle-shape, triangle-shape, or square-shape patterns. Patterns with any other suitable shape are within the contemplated scope of the disclosure.

In the embodiment, the modulating patterns 312 may include a group of first modulating patterns 3121 and a group of second modulating patterns 3122, a first size of the group of first modulating patterns 3121 is smaller than a second size of the group of second modulating patterns 3122, wherein a first distance between the group of first modulating patterns 3121 and the waveguide WG is less than a second distance between the group of second modulating patterns 3122 and the waveguide WG. In other words, in the embodiment, the group of first modulating patterns 3121 closer to the waveguide WG may have a smaller size, such that the mode field matching between the grating patterns and the optical fiber may be enhanced.

Referring to FIG. 2 and FIG. 6, in some embodiments, the modulating patterns 312 may be dents on the upper surface 13S of the light-guiding material layer 13. The dents of the modulating patterns 312 may be formed by etching the light-guiding material layer 13 by a same or separate etching processes as the gaps 124 and the grooves 227, and after the etching processes, the dents may be filled with cladding material having a refractive index smaller than that of the light-guiding material layer 13.

In the above-mentioned optical device (100~300), the light transmitted from or to the optical device may be more focused and loss of light may be reduced. And therefore, a grating coupler having higher coupling efficiency with respect to all frequencies and thus having broader bandwidth is provided.

In accordance with some embodiments of the disclosure, an optical device for coupling light propagating between a waveguide and an optical transmission component is provided. The optical device including a taper portion and a grating portion. The grating portion is connected to the taper portion. The grating portion includes grating patterns. Ends of the grating patterns are separated from an outer edge of the optical device by a distance. In some embodiments, the grating patterns comprise arc-shaped grating patterns. In some embodiments, each of the grating patterns has a constant width. In some embodiments, a first width of a first grating pattern among the grating patterns is larger than a second width of a second grating pattern among the grating patterns, and a first distance between the first grating pattern and the waveguide is less than a second distance between the second grating pattern and the waveguide. In some embodiments, the grating patterns comprise apodized grating patterns or uniform grating patterns. In some embodiments, the grating portion further comprises a pair of light-confinement patterns extending from the taper portion, the pair of light-confinement patterns are disposed at opposite sides of the grating patterns, and the pair of light-confinement patterns are separated from the ends of the grating patterns. In some embodiments, the taper portion further comprises modulating patterns disposed in proximity to the grating portion, and the modulating patterns are separated from each other. In some embodiments, the modulating patterns comprise a group of first modulating patterns and a group of second modulating patterns, a first size of the group of first modulating patterns is smaller than a second size of the group of second modulating patterns, wherein a first distance between the group of first modulating patterns and the waveguide is less than a second distance between the group of second modulating patterns and the waveguide.

In accordance with some embodiments of the disclosure, an optical device is provided. The optical device includes a waveguide, a taper portion and a grating portion. The taper portion extends from a first end of the waveguide. The grating portion has a coupling region and a periphery region. The taper portion is disposed between the waveguide and the grating portion. The grating portion includes grating patterns. The grating patterns are confined within the coupling region, and the taper portion and the periphery region surround the coupling region. In some embodiments, the coupling region further comprises gaps between the grating patterns, and the gaps and the grating patterns are located within the coupling region. In some embodiments, the grating portion further comprises a pair of light-confinement patterns extending from the taper portion, and the pair of light-confinement patterns surrounds and distances from the coupling region. In some embodiments, widths of the light-confinement patterns decrease as farther away from the waveguide. In some embodiments, an end portion of the waveguide is arranged along an axis, and the light-confinement patterns are substantially symmetric with respect to the axis.

In accordance with some embodiments of the disclosure, a device for receiving light from or outputting light to an optical fiber is provided. The device includes a light-guiding material layer. The light-guiding material layer has an upper surface facing the optical fiber. The light-guiding material layer includes a waveguide and a grating coupler. The grating coupler includes a first portion and a second portion. The first portion is optically coupled to the waveguide. The second portion is optically coupled to the first portion and the optical fiber. The second portion includes grating patterns. A region of the second portion is covered by a core of the optical fiber such that ends of the grating patterns are located between an edge of the region covered by the core of the optical fiber and an outer edge of the grating coupler. In some embodiments, the region covered by the core of the optical fiber is substantially in a shape of circle or ellipse. In some embodiments, a distance from a center of the region covered by the core of the optical fiber to an end of a grating pattern of the grating portion is substantially 1.5 to 2 times of a radius of the region covered by the core of the optical fiber. In some embodiments, the second portion further comprises a pair of light-confinement patterns extending from the first portion, the pair of light-confinement patterns are separated from the ends of the grating patterns by grooves on the upper surface of the light-guiding material layer, and wherein the grooves are filled with cladding material having a refractive index smaller than that of the light-guiding material layer. In some embodiments, the first portion further comprises modulating patterns disposed in proximity to the second portion. In some embodiments, the modulating patterns are dents on the upper surface of the light-guiding material layer. In some embodiments, the dents are filled with cladding material having a refractive index smaller than that of the light-guiding material layer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical device for coupling light propagating between a waveguide and an optical transmission component, the optical device comprising:
    a taper portion; and
    a grating portion, connected to the taper portion, the grating portion comprising:
        grating patterns, wherein ends of the grating patterns are separated from an outer edge of the optical device by a distance; and
        a pair of light-confinement patterns extending from the taper portion, wherein the pair of light-confinement patterns are disposed at opposite sides of the grating patterns, and the pair of light-confinement patterns are separated from ends of the grating patterns.

2. The optical device as claimed in claim 1, wherein the grating patterns comprise arc-shaped grating patterns.

3. The optical device as claimed in claim 1, wherein each of the grating patterns has a constant width.

4. The optical device as claimed in claim 1, wherein a first width of a first grating pattern among the grating patterns is larger than a second width of a second grating pattern among the grating patterns, and a first distance between the first grating pattern and the waveguide is less than a second distance between the second grating pattern and the waveguide.

5. The optical device as claimed in claim 1, wherein the grating patterns comprise apodized grating patterns or uniform grating patterns.

6. The optical device as claimed in claim 1 further comprising a cladding layer covering the taper portion and the grating portion, wherein the pair of light-confinement patterns are separated from the ends of the grating patterns by the cladding layer.

7. The optical device as claimed in claim 1, wherein the taper portion further comprises modulating patterns disposed in proximity to the grating portion, and the modulating patterns are separated from each other.

8. The optical device as claimed in claim 7, wherein the modulating patterns comprise a group of first modulating patterns and a group of second modulating patterns, a first size of the group of first modulating patterns is smaller than a second size of the group of second modulating patterns, wherein a first distance between the group of first modulating patterns and the waveguide is less than a second distance between the group of second modulating patterns and the waveguide.

9. An optical device, comprising:
    a waveguide,
    a taper portion, extending from a first end of the waveguide, and
    a grating portion, having a coupling region and a periphery region, wherein the taper portion is disposed between the waveguide and the grating portion, and the grating portion comprises:
        grating patterns, wherein the grating patterns are confined within the coupling region, and the taper portion and the periphery region surround the coupling region; and
        a pair of light-confinement patterns extending from the taper portion, wherein the pair of light-confinement patterns are spaced apart from ends of the grating patterns.

10. The optical device as claimed in claim 9, wherein the coupling region further comprises gaps between the grating patterns, and the gaps and the grating patterns are located within the coupling region.

11. The optical device as claimed in claim 9 further comprising a cladding layer covering the wave guide, the taper portion and the grating portion, wherein the pair of light-confinement patterns are separated from ends of the grating patterns by the cladding layer.

12. The optical device as claimed in claim 9, wherein widths of the light-confinement patterns decrease as farther away from the waveguide.

13. The optical device as claimed in claim 9, wherein an end portion of the waveguide is arranged along an axis, and the light-confinement patterns are substantially symmetric with respect to the axis.

14. A device for receiving light from or outputting light to an optical fiber, the device comprising:
    a light-guiding material layer, having an upper surface facing the optical fiber, the light-guiding material layer comprising
    a waveguide, and
    a grating coupler, comprising:
        a first portion, optically coupled to the waveguide; and
        a second portion, optically coupled to the first portion and the optical fiber, the second portion comprising grating patterns, wherein a region of the second portion is covered by a core of the optical fiber such that ends of the grating patterns are located between an edge of the region covered by the core of the optical fiber and an outer edge of the grating coupler, and wherein the second portion further comprises a pair of light-confinement patterns extending from the first portion, the pair of light-confinement patterns are separated from the ends of the grating patterns by grooves on the upper surface of the light-guiding material layer.

15. The device as claimed in claim 14, wherein the region covered by the core of the optical fiber is substantially in a shape of circle or ellipse.

16. The device as claimed in claim 15, wherein a distance from a center of the region covered by the core of the optical fiber to an end of a grating pattern of the grating portion is substantially 1.5 to 2 times of a radius of the region covered by the core of the optical fiber.

17. The device as claimed in claim 14, wherein the grooves are filled with cladding material having a refractive index smaller than that of the light-guiding material layer.

18. The device as claimed in claim 14, wherein the first portion further comprises modulating patterns disposed in proximity to the second portion.

19. The device as claimed in claim 18, wherein the modulating patterns are dents on the upper surface of the light-guiding material layer.

20. The device as claimed in claim 19, wherein the dents are filled with cladding material having a refractive index smaller than that of the light-guiding material layer.

* * * * *